Dec. 23, 1930.    T. H. CARPENTER    1,785,807
APPARATUS FOR PRESSURE CONTROL
Filed Aug. 3, 1927    2 Sheets-Sheet 1
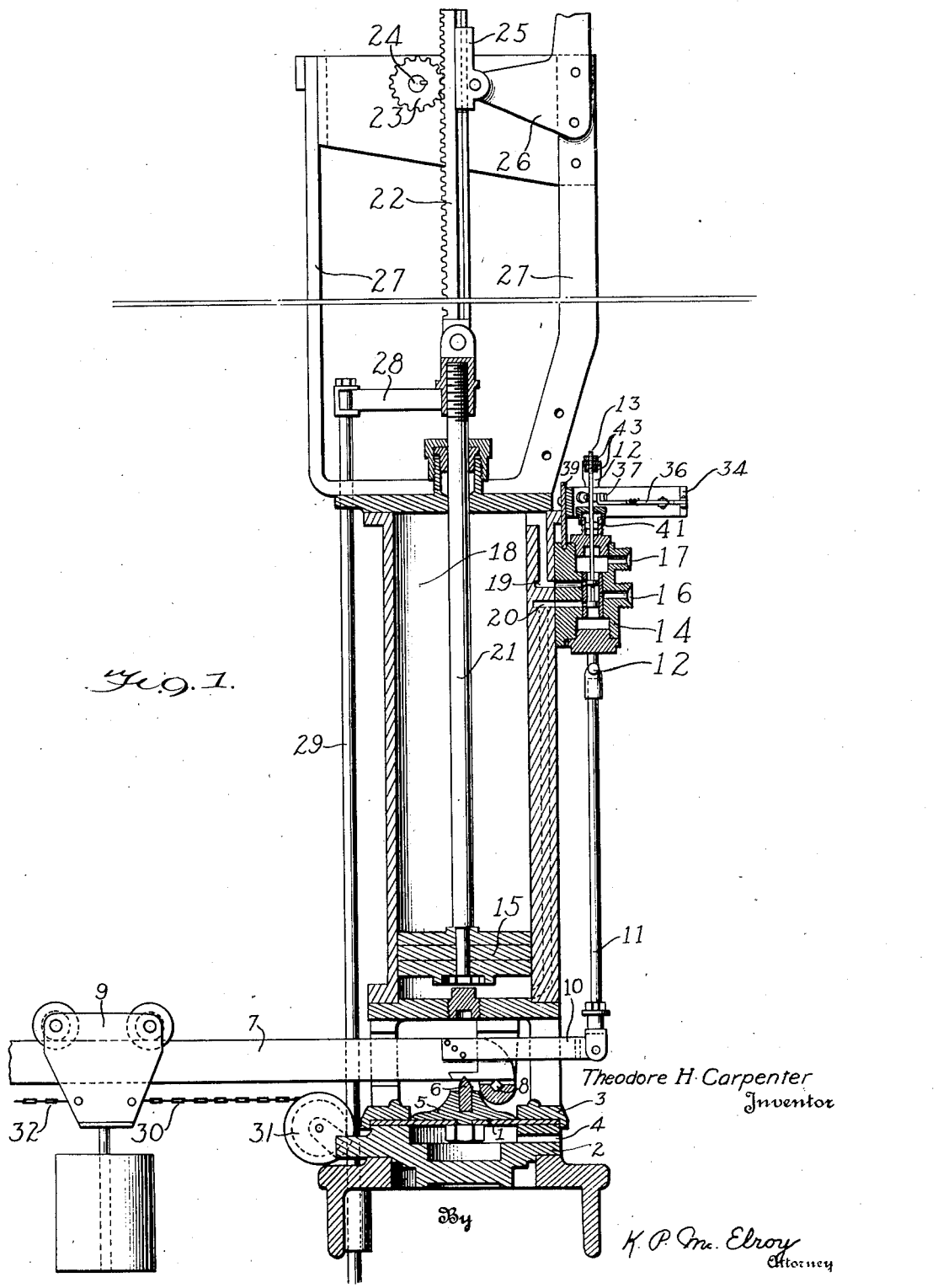

Dec. 23, 1930.    T. H. CARPENTER    1,785,807
APPARATUS FOR PRESSURE CONTROL
Filed Aug. 3, 1927    2 Sheets-Sheet 2
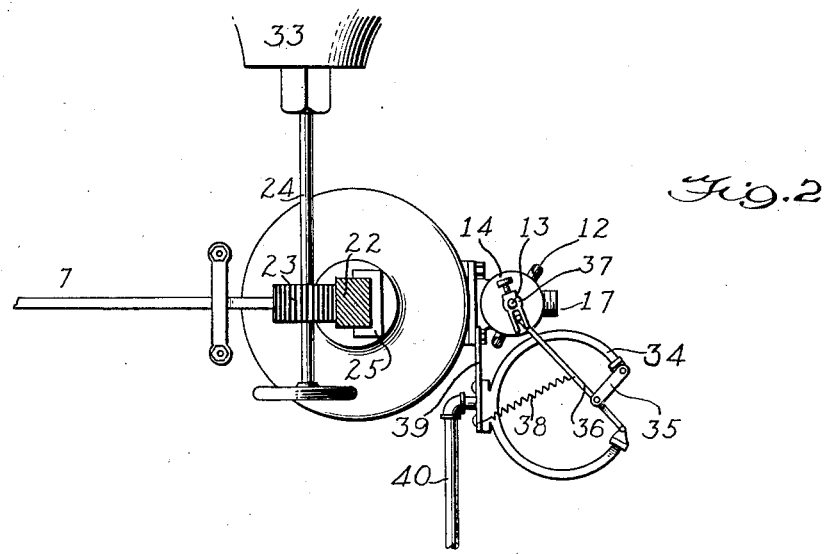
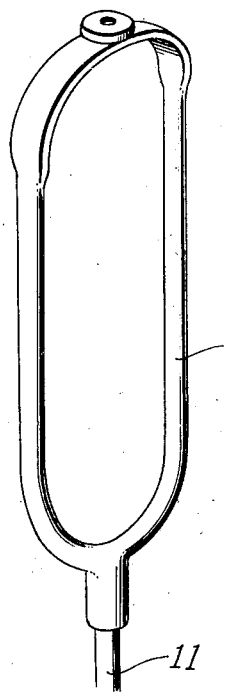
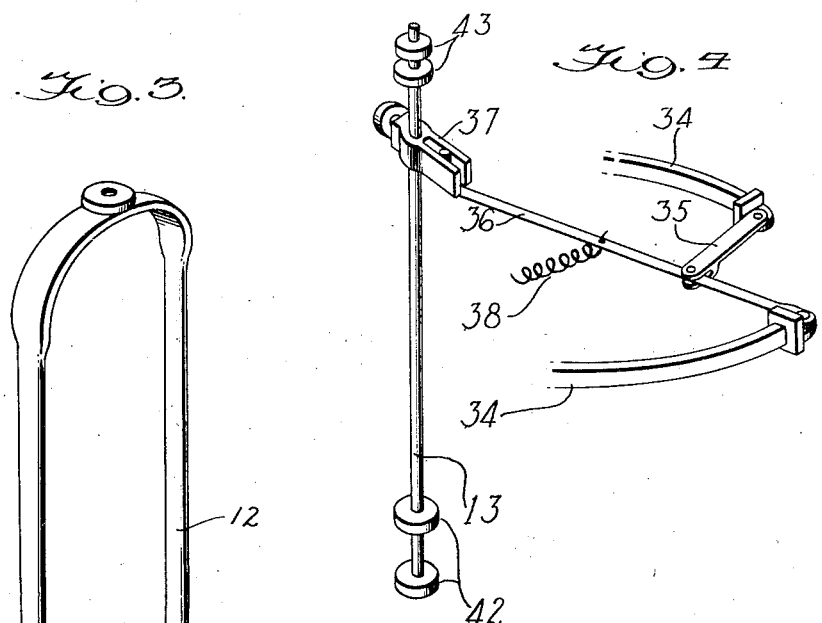
Theodore H Carpenter
Inventor
By K. P. McElroy Attorney Patented Dec. 23, 1930

1,785,807

UNITED STATES PATENT OFFICE

THEODORE H. CARPENTER, OF PORT ARTHUR, TEXAS, ASSIGNOR TO GULF REFINING COMPANY, OF PITTSBURGH, PENNSYLVANIA, A CORPORATION OF TEXAS

APPARATUS FOR PRESSURE CONTROL

Application filed August 3, 1927. Serial No. 210,332.

This invention relates to apparatus for pressure control; and it relates more particularly to that class of apparatus which is independent of and does not attempt to regulate the sources through which the pressure is generated, but which controls the maximum pressure in a system by permitting the escape of those products in excess of those necessary for the maintenance of the desired pressure. It comprises an apparatus in which the pressure to be controlled operates upon a flexible diaphragm, the opposed movement of which, acting through levers, a connecting rod, and a delicately responsive pilot valve, effects the movement of a piston in synchronism with the pressure change, and the movement of this piston and an attached rack operates through a pinion headed valve to relieve the system of any excessive pressure.

In the cracking distillation of petroleum oil it is common to maintain the system under a superatmospheric pressure, and the maintenance of this pressure without substantial variation is of extreme importance. Those processes which are conducted continuously are characterized by continuous feed of raw material and by continuous removal of distillate, of degraded oil, and of non-condensible gas. The liquid products are removed as made or at definite predetermined rates, while the maintenance of a uniform pressure is effected either by the controlled release of the non-condensible gases at the outlet of the system or by the controlled release of the generated vapors during their passage to a condenser (and frequently after a first partial condensation). Whether the control be by means of the gases which persist after having passed through the final condenser or whether the control be by means of the vapors before entering the final condenser, the effect will be the same. In either case this control will determine the pressure existing on the heating and vaporizing portions of the apparatus.

In the past it has been customary to operate the control valve either manually or by means of an automatic regulator which was actuated by any variation of pressure in the system. Manual operation, subject at best to all the uncertainties of human fallibility, has seldom kept the range of variation within less than ten pounds per square inch. Automatic regulators, when maintained in good condition, have reduced the range of variation to five pounds and recording charts have indicated this variation from ten to twenty times per hour. This extent of variation and this frequency of variation in the pressure has caused the production of a reduced quantity of desirable material, and this in mixture with much undesirable material which must then be separated out, which is a matter of some difficulty and of appreciable expense. One type of automatic regulator which has been much favored for this purpose is a hydraulically operated controller in which the pressure to be controlled is connected to one side of a flexible diaphragm, the movement of which is opposed by a system of weighted levers and is transferred through a series of valve links to a pilot valve which directs a stream of water or other fluid under high pressure to the proper side of a piston, the amount and direction of movement of the piston being related to the pressure variation. This type of regulator has suffered from an inability to maintain the pressure within a range of less than five pounds per square inch.

I have overcome the deficiencies of previous types of regulators to a remarkable degree and have produced a regulator which will maintain the pressure within a range of less than one pound and which will reduce the frequency to the point where it is no longer a matter of any concern. In one pressure recording chart, which is typical, the frequency was two in twenty-four hours.

Referring to the accompanying drawings, illustrating one specific embodiment of my invention:

Fig. 1 is a general view of the apparatus, shown in vertical section.

Fig. 2 is a plan view with part of the upper framework omitted in order to bring out more clearly those features which constitute the invention.

Fig. 3 illustrates the yoke at the upper end of the valve rod.

Fig. 4 illustrates the valve stem and the means of giving it an oscillating motion.

In the drawings, 1 indicates the usual flexible diaphragm fastened between the lower frame 2 and the upper frame 3 of the regulator. Opening 4 is in connection with the source of pressure to be regulated, so that the pressure is exerted upon the under side of the diaphragm. This diaphragm carries a stud 5 provided with a knife blade 6 upon which rests the lever 7 fulcrumed at 8 and bearing at the other end a stationary weight (not shown), and between such stationary weight and the fulcrum point a movable weight 9. At the fulcrum end of the lever 7 is attached an extension arm 10 carrying at its extremity a valve rod 11 in turn connected to a yoke 12 which is given a vertical reciprocating movement upon movement of the lever 7 actuated by the diaphragm 1. This is the usual construction. There is used with such regulators a pilot valve 14 governing ports 19 and 20 to operate the piston 15 and the cylinder 18. This pilot valve 14 ordinarily carries a valve stem made in two parts connected through a universal joint, the upper portion of this valve stem passing through a stuffing box. The essential tightness of the packing of the stuffing box exerts considerable resistance to the movement of the upper part of this stem 13 and since that part of the valve stem connected to the yoke is attached through a loose fitting universal joint to its lower part carrying the valve discs there is some play in the stem 13, and since this stem is controlled by the yoke 12 operated through rod 11 by the diaphragm 1, there can be no functioning of the pilot valve (and through it, of the regulator) until the pressure variation has been great enough to move the diaphragm and valve links through an amount equal to the lost motion in the stem of the pilot valve. This causes considerable variation in the pressure as controlled by the diaphragm.

My improvement resides in pilot valve 14 and the parts incidental thereto as combined with the type of regulator heretofore described. Before proceeding to describe this improvement in detail I shall describe the operation of this known type of regulator in order that the advantages of my invention may be appreciated.

As stated the pilot valve 14 operates to control the ports 19 and 20. The operating fluid for the pilot valve is admitted through inlet 16, while 17 is a drain connection. The actuating fluid entering or leaving the cylinder 18 passes through ports 19 and 20 and the motion of piston 15 is transferred through piston rod 21 and rack 22 to the pinion 23 mounted upon the stem 24 of the main controlling valve 33 of the system. The rack 22 is held to its position in contact with the pinion 23 by means of guide 25 supported by the extension 26 from the upper framework 27. Also attached to the piston rod 21 is the arm 28 and the parallel rod 29, at the lower end of which is attached chain 30 at a point some distance below the pulley wheel 31. At the outer extremity of the lever 7 is another pulley wheel (not shown) over which moves the chain 32 carrying a counter weight (not shown), the purpose of which is to exert a force to carry the sliding weight 9 outward on the lever 7 in opposition to the pull exerted in the opposite direction by the chain 30.

In the operation of this device a high pressure water connection is made to inlet 16 while outlet 17 is connected to a drain. The pressure to be regulated is connected to port 4. Any increase in the pressure of the system causes an upward movement of diaphragm 1 and of diaphragm stud 5 carrying knife blade 6. This upward movement is resisted by the lever 7 which moves about a fulcrum 8 at one end and which bears a stationary weight (not shown) at the other end as well as the movable weight 9. The increased pressure causes an upward movement of the lever 7 and a downward movement of the extension 10, of the connecting rod 11, of the yoke 12, and of the stem 13 of the pilot valve 14. The downward motion of the stem of this pilot valve permits fluid to enter from connection 16 through the port 20 to the lower face of the piston 15, forcing that piston upward. The upward movement of the piston, acting through the piston rod 21 and the rack 22, on the pinion 23 attached to the stem 24 of valve 33, causes an opening movement of this valve sufficient to relieve the pressure to the desired point. Should the pressure in the system being controlled tend to drop below the desired point, the lessening of the pressure on the lower side of diaphragm 1 permits a falling of the lever 7, with an accompanying rise of extension 10, of connecting rod 11, of yoke 12, and of stem 13 of the pilot valve 14. This movement shuts off the flow of fluid through the port 20 to the under face of piston 15, opens the port 20 to the drain connection 17, and permits the fluid from high pressure connection 16 to flow through port 19 to the upper face of the piston, causing a downward movement of the piston. The downward movement of piston 15 and of the connected piston rod 21, and rack 22, operating on the pinion 23 causes a closing movement of the valve 33, resulting in an increase of pressure in the system. The purpose of the sliding weight 9, connected by chain 30 with parallel rod 29 is to move along the lever 7 in such manner as to increase resistance to movement of the diaphragm 1 and thus dampen movements of the apparatus.

The foregoing description is given only in sufficient detail to elucidate the general apparatus used. This is a common mechanical device and complete details of its structure and operation will be found in United States Patent 1,291,063 to G. S. Melcher.

As stated my invention has to do with the pilot valve 14 and its incidental parts. I make the valve stem 13 of the pilot valve 14 in one piece. It carries at its lower end the usual closure piece comprising the two valve closing discs 42, and where it passes through the yoke 12 I provide two close fitting collars 43 so that any movement of the yoke is immediately, without any possibility of play, transmitted to this stem. Leakage of the actuating fluid is restrained by the stuffed packing gland 41, and the essential tightness of this packing exerts some resistance to the movement of the stem 13. This resistance, which we might call static friction is a major cause of the poor operation of the corresponding part of this type of regulator in the past.

With a view to preventing binding at the packing 41 and to provide a delicately responsive pilot valve, I give to the valve stem 13 a continuous reciprocating motion about its axis so that an extremely slight force will impose a vertical movement upon the reciprocating axial movement. To provide this axial movement I use a curved Bourdon tube 34, such as is used in pressure gauges, mounting this by the plate 39 on the pilot valve 14, and connecting thereto a pulsating pressure through the line 40. The movement of the Bourdon tube, resulting from the pulsating pressure, is transmitted through the link 35 and the L shaped rod 36 to a slotted lug 37 fastened to the valve stem 13. The return movement of the L shaped rod 36, with each drop of pressure, is assisted by a coiled spring 38. This gives extreme sensitivity to the pilot valve and through the pilot valve to the piston 21, the rack 22, and the pinion headed valve 33 which maintains the pressure.

The regulator shown in Figure 1, and in connection with which my improvement is illustrated and described, is a very common industrial device. However, it is but one of many fluid operated devices, all of which have a similar pilot valve as one of the essential elements. These devices are arranged to perform many different industrial functions and their generally recognized shortcomings have been the amount of force and the amount of motion required before they have responded. Not only have these shortcomings reduced their effectiveness in the uses to which they have been put, but they have precluded their use for many other desirable functions. The lack of response has resulted from the binding effect on the valve stem of the packing in the head of the pilot valve and from the play in the joint of the valve stem in its previous form. I have overcome both of these features in a highly satisfactory manner, not only reducing the variations of the past to an extremely small proportion of their previous extent, but, by greatly increasing the sensitivity of the pilot valve, have made it respond to the more minute forces which are available in many instances. This same sensitivity to more minute forces causes the pilot valve to recognize tendencies at their inception, and by resisting them in proportion to their intensity, to dampen out the frequency of variation in the same thorough manner in which the degree of variation has been reduced.

The embodiment of my invention as here set forth does not include all of its applications, but is purely exemplificatory.

What I claim is:

1. In a fluid operated regulating device controlled by a pilot valve, a stem for the pilot valve, and a Bourdon element communicating with a pulsating pressure and means arranged to translate its motion into rotative oscillations of the stem of the pilot valve.

2. A delicately responsive valve having a movable closure piece, a valve stem attached to the closure piece, and a Bourdon element communicating with a pulsating pressure and means operably connecting the said element with the valve stem to translate the motion of the Bourdon element into oscillations of the said stem.

3. In a fluid operated regulating device a valve through which regulation is effected, an element translating changes in the system under regulation into motion, a valve stem securely fastened to the closure piece of said valve and through which the motion of said element is transferred to said valve, a Bourdon element in communication with a pulsating pressure and means arranged to translate its motion into oscillations of the valve stem in a direction other than that incident to its opening and closing function.

In testimony whereof, I have hereunto affixed my signature.

THEODORE H. CARPENTER.